United States Patent
Lian et al.

(10) Patent No.: US 10,723,227 B2
(45) Date of Patent: Jul. 28, 2020

(54) BRAKE SYSTEM AND METHOD FOR FOUR-WHEEL DRIVE ELECTRIC VEHICLE AND ELECTRIC VEHICLE

(71) Applicant: BYD COMPANY LIMITED, Shenzhen, Guangdong (CN)

(72) Inventors: Yubo Lian, Shenzhen (CN); Heping Ling, Shenzhen (CN); Fanliang Meng, Shenzhen (CN); Yanfei Xiong, Shenzhen (CN); Weiqiang Chen, Shenzhen (CN)

(73) Assignee: BYD COMPANY LIMITED, Shenzhen, Guangdong (CN)

( * ) Notice: Subject to any disclaimer, the term of this patent is extended or adjusted under 35 U.S.C. 154(b) by 351 days.

(21) Appl. No.: 15/750,042

(22) PCT Filed: Aug. 10, 2016

(86) PCT No.: PCT/CN2016/094455
§ 371 (c)(1),
(2) Date: Feb. 2, 2018

(87) PCT Pub. No.: WO2017/025041
PCT Pub. Date: Feb. 16, 2017

(65) Prior Publication Data
US 2018/0229610 A1    Aug. 16, 2018

(30) Foreign Application Priority Data
Aug. 11, 2015    (CN) .......................... 2015 1 0487944

(51) Int. Cl.
*B60L 3/00* (2019.01)
*B60L 7/18* (2006.01)
(Continued)

(52) U.S. Cl.
CPC ............... *B60L 3/0076* (2013.01); *B60L 7/18* (2013.01); *B60L 7/26* (2013.01); *B60L 15/2009* (2013.01);
(Continued)

(58) Field of Classification Search
CPC .... B60L 3/0076; B60L 58/13; B60L 15/2009; B60L 7/02; B60L 7/006; B60L 7/22;
(Continued)

(56) References Cited

U.S. PATENT DOCUMENTS 6,120,115 A * 9/2000 Manabe .................... B60T 8/00
303/152
9,108,514 B2 * 8/2015 Kunz ....................... B60T 8/267
(Continued)

FOREIGN PATENT DOCUMENTS

| CN | 101648523 A | 2/2010 |
| CN | 201400078 Y | 2/2010 |

(Continued)

OTHER PUBLICATIONS

International Search Report from PCT/CN2016/094455 dated Oct. 26, 2016 (4 pages).

*Primary Examiner* — Christian Chace
*Assistant Examiner* — Michael F Whalen
(74) *Attorney, Agent, or Firm* — Calfee Halter & Griswold LLP

(57) ABSTRACT

A brake system (100) and a brake method for a four-wheel drive electric vehicle and a four-wheel drive electric vehicle, in the system, according to a brake mode of the electric vehicle, a state of charge of a battery pack (4) and a vehicle speed, a first brake control unit controls a motor (6) to brake a wheel (9) through a motor controller (2) and a second brake control unit controls a brake actuator (12) to brake the wheels (9). The first brake control unit further determines
(Continued)

whether a brake torque of the brake actuator (12) on the wheels (9) fails. If yes, the first brake control unit controls the motor (6) to brake the corresponding wheel (9) through the motor controller (2).

14 Claims, 2 Drawing Sheets

(51) Int. Cl.
| | | |
|---|---|---|
| *B60L 7/26* | (2006.01) | |
| *B60L 15/20* | (2006.01) | |
| *B60L 58/13* | (2019.01) | |
| *B60T 7/04* | (2006.01) | |
| *B60T 8/171* | (2006.01) | |
| *B60T 8/172* | (2006.01) | |
| *B60T 8/72* | (2006.01) | |
| *B60T 13/74* | (2006.01) | |

(52) U.S. Cl.
CPC .............. *B60L 58/13* (2019.02); *B60T 7/042* (2013.01); *B60T 8/171* (2013.01); *B60T 8/172* (2013.01); *B60T 8/72* (2013.01); *B60T 13/741* (2013.01); *B60L 2220/46* (2013.01); *B60L 2240/12* (2013.01); *B60L 2240/421* (2013.01); *B60L 2240/423* (2013.01); *B60L 2250/26* (2013.01); *B60L 2260/28* (2013.01); *B60T 2270/402* (2013.01); *B60T 2270/604* (2013.01); *Y02T 10/645* (2013.01); *Y02T 10/646* (2013.01); *Y02T 10/705* (2013.01); *Y02T 10/7005* (2013.01); *Y02T 10/7044* (2013.01); *Y02T 10/72* (2013.01); *Y02T 10/7275* (2013.01)

(58) Field of Classification Search
CPC ...... B60L 7/26; B60L 7/18; B60L 7/28; B60L 2220/46; B60L 2240/423; B60L 2240/421; B60L 2240/12; B60L 2260/28; B60L 2250/26; B60T 13/741; B60T 8/72; B60T 8/172; B60T 8/171; B60T 7/042; B60T 2270/604; B60T 2270/402; Y02T 10/7275; Y02T 10/646; Y02T 10/7044; Y02T 10/705; Y02T 10/7005; Y02T 10/645; Y02T 10/72
See application file for complete search history.

(56) References Cited

U.S. PATENT DOCUMENTS

| | | | |
|---|---|---|---|
| 10,189,476 B1* | 1/2019 | Edren | B60L 53/56 |
| 2007/0200523 A1 | 8/2007 | Sasaki et al. | |
| 2008/0090688 A1 | 4/2008 | Torres et al. | |
| 2013/0175954 A1 | 7/2013 | Astigarraga et al. | |
| 2014/0084673 A1* | 3/2014 | Matsuoka | B60T 8/4872 303/3 |
| 2014/0152201 A1* | 6/2014 | Shriver | F03D 7/0252 318/376 |
| 2015/0130264 A1* | 5/2015 | Isono | B60T 8/17 303/3 |
| 2015/0360570 A1* | 12/2015 | Jung | B60L 7/08 701/70 |
| 2018/0065488 A1* | 3/2018 | Nam | B60T 8/172 |
| 2018/0208078 A1* | 7/2018 | Borgmann | B60L 7/10 |
| 2019/0135258 A1* | 5/2019 | Chuang | B60T 1/10 |

FOREIGN PATENT DOCUMENTS

| | | | | |
|---|---|---|---|---|
| CN | 103171444 A | 6/2013 | | |
| CN | 103332184 A | 10/2013 | | |
| CN | 104494599 A | 4/2015 | | |
| CN | 104670011 A | 6/2015 | | |
| CN | 104890669 A | 9/2015 | | |
| JP | 2004268901 A | 9/2004 | | |
| JP | 2005153790 A | 6/2005 | | |
| JP | 2009227221 A | 10/2009 | | |
| JP | 2011240740 A | 12/2011 | | |
| WO | WO-2006038309 A1 * | 4/2006 | | B62D 9/007 |

* cited by examiner

BRAKE SYSTEM AND METHOD FOR FOUR-WHEEL DRIVE ELECTRIC VEHICLE AND ELECTRIC VEHICLE

CROSS REFERENCE TO RELATED APPLICATION

This application is based on International Application No. PCT/CN2016/094455, filed on Aug. 10, 2016, which is based upon and claims a priority to Chinese Patent Application No. 201510487944.0, filed on Aug. 11, 2015, the entire contents of which are incorporated herein by reference.

FIELD

The present disclosure relates to the field of vehicles, and in particular, to a brake system for a four-wheel drive electric vehicle, a brake method for a four-wheel drive electric vehicle and a four-wheel drive electric vehicle.

BACKGROUND

In a conventional passenger vehicle, a conventional hydraulic brake system is essential. In addition, an anti-lock braking system (ABS) and an electronic stability program (ESP) can hydraulically brake a single or multiple wheels on the basis of the hydraulic brake system, so as to achieve an effect of speed reduction. However, when brake is necessary in the case of high speed driving, of taking turns or of avoiding obstacles abruptly, consequences would be unimaginable once brake of the systems fails.

SUMMARY

The present disclosure seeks to solve at least one of technical problems existing in the related art. To this end, the present disclosure provides a brake system for a four-wheel drive electric vehicle, a brake method for a four-wheel drive electric vehicle and a four-wheel drive electric vehicle.

A brake system for a four-wheel drive electric vehicle includes a vehicle controller including a first brake control unit and a second brake control unit; a signal detection sensor, configured to detect a brake pedal depth signal and a vehicle speed signal; and a motor controller, in which, the first brake control unit is configured to determine a brake mode of the electric vehicle according to the brake pedal depth signal, to determine whether a current value of a state of charge of a battery pack of the electric vehicle is greater than a preset value of the state of charge and to determine whether a vehicle speed value of the electric vehicle is less than a preset vehicle speed value according to the vehicle speed signal, the brake mode of the electric vehicle includes a first brake mode and a second brake mode; the motor controller is configured to control a motor of the electric vehicle to regeneratively brake a wheel when the electric vehicle is in the first brake mode, the vehicle speed value is greater than or equal to the preset vehicle speed value and the current value of the state of charge is less than or equal to the preset value of the state of charge; and the second brake control unit is configured to control a brake actuator of the electric vehicle to brake the wheels of the electric vehicle when the electric vehicle is in the first brake mode and the vehicle speed value is less than the preset vehicle speed value, or when the electric vehicle is in the first brake mode and the current value of the state of charge is greater than the preset value of the state of charge, or when the electric vehicle is in the second brake mode.

A brake method for a four-wheel drive electric vehicle includes: detecting a brake pedal depth signal and a vehicle speed signal; determining a brake mode of the electric vehicle according to the brake pedal depth signal, whether a current value of a state of charge of a battery pack of the electric vehicle is greater than a preset value of the state of charge and whether a vehicle speed value of the electric vehicle is less than a preset vehicle speed value according to the vehicle speed signal, the brake mode of the electric vehicle includes a first brake mode and a second brake mode; controlling a brake actuator of the electric vehicle to brake wheels of the electric vehicle when the electric vehicle is in the first brake mode and the vehicle speed value is less than the preset vehicle speed value, or when the electric vehicle is in the first brake mode and the current value of the state of charge is greater than the preset value of the state of charge, or when the electric vehicle is in the second brake mode; and controlling a motor of the electric vehicle to regeneratively brake a wheel when the electric vehicle is in the first brake mode and the vehicle speed value is greater than or equal to the preset vehicle speed value and the current value of the state of charge is equal to or less than the preset value of the state of charge.

A four-wheel drive electric vehicle includes the brake system for a four-wheel drive electric vehicle described above; a battery pack; a motor; and a brake actuator, in which the battery pack, the motor and the brake actuator are connected with the brake system for a four-wheel drive electric vehicle respectively.

Additional aspects and advantages of the present disclosure will be given in part in the following descriptions, become apparent in part from the following descriptions, or be learned from the practice of the present disclosure.

BRIEF DESCRIPTION OF THE DRAWINGS

These and other aspects and advantages of the present disclosure will become apparent and more readily appreciated from the following descriptions made with reference to the drawings, in which.

DETAILED DESCRIPTION

Figure 1:
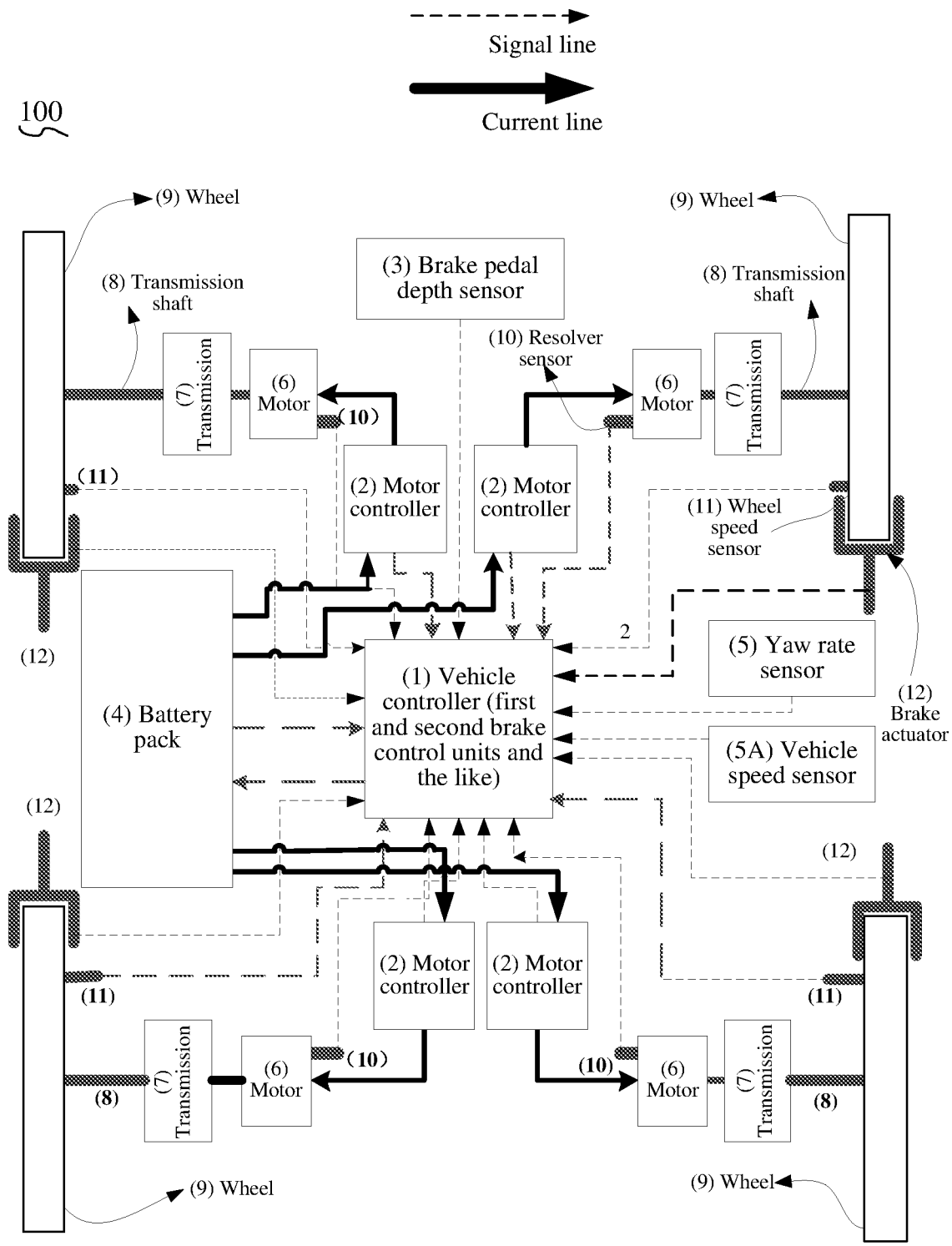
FIG. 1 is a schematic diagram of a brake system for a four-wheel drive electric vehicle according to an embodiment of the present disclosure.

Embodiments of the present disclosure will be described in detail below. Examples of the embodiments are illustrated in the drawings, in which the same or similar elements and the elements having same or similar functions are denoted by like reference numerals. The embodiments described herein with reference to drawings are explanatory, illustrative, and should be used to generally understand the present disclosure. The embodiments shall not be construed to limit the present disclosure.

In the description of the present disclosure, it should be understood that, terms such as "first" and "second" are used herein for purposes of description and are not intended to indicate or imply relative importance or significance or to imply the number of indicated technical features. Thus, the feature defined with "first" and "second" may include one or more of this feature. In the description of the present disclosure, "a plurality of" means two or more than two, unless specified otherwise.

In the description of the present disclosure, it should be understood that, unless specified or limited otherwise, the terms "mounted," "connected," and "coupled" should be understood broadly, for example, which may be fixed connections, detachable connections or integral connections; may be mechanical connections, electrical connections or mutual communication; may be direct connections, indirectly connected with each other through an intermediate medium, or communications inside two elements or an interaction relationship of two elements. Those of ordinary skill in the art can understand specific meanings of the terms in the present disclosure according to specific situations.

The disclosure hereinafter provides lots of different embodiments or examples to achieve different structures of the present disclosure. In order to simplify the disclosure of the present disclosure, components and settings of specific examples are described hereinafter. Certainly, they are merely examples, and are not intended to limit the present disclosure. In addition, the present disclosure can repeat reference numbers and/or reference letters in different examples, but such repetitions are for simplification and clarity, which do not indicate relationships between the embodiments and/or settings discussed. In addition, the present disclosure provides examples of various specific processes and materials, but those of ordinary skill in the art can realize applications of other processes and/or use of other materials.

In the related art, if a hydraulic brake system and an ABS or an ESP on the basis of the hydraulic brake system are used to brake, and when brake is necessary in the case of high speed driving, of taking turns or of avoiding obstacles abruptly, consequences would be unimaginable once brake of these systems fails.

In addition, with development of new vehicle energy, four-wheel independent drive electric vehicles have emerged accordingly. The four-wheel independent drive electric vehicle uses four motors to control four wheels separately. The motor has a fast response speed (about 20 millisecond), which has a great advantage compared with the response time of the conventional hydraulic brake (about 200 millisecond). Therefore, it becomes a problem to be solved urgently that how to use the four-wheel independent drive electric vehicle to perform anti-brake-failure control.

To this end, embodiments of the present disclosure provide a brake system for a four-wheel drive electric vehicle, a brake method for a four-wheel drive electric vehicle and a four-wheel drive electric vehicle. The brake system for a four-wheel drive electric vehicle, the brake method for a four-wheel drive electric vehicle and the four-wheel drive electric vehicle provided in the embodiments of the present disclosure are specifically described below with reference to drawings.

Referring to FIG. 1, an embodiment of the present disclosure provides a brake system 100 for a four-wheel drive electric vehicle. The brake system 100 is suitable for the four-wheel independent drive electric vehicle.

In an embodiment of the present disclosure, the electric vehicle includes a battery pack 4, four motors 6 and a brake actuator 12. One motor 6 corresponds to one wheel 9.

Specifically, in an embodiment, each motor 6 may be a wheel-side motor which is connected to a corresponding wheel 9 through a transmission 7 and a transmission shaft 8. In another embodiment, each motor 6 may be a hub motor, and the transmission 7 may be omitted in the electric vehicle under the case of the hub motor, which facilitates layout of components of the electric vehicle.

In an embodiment of the present disclosure, the electric vehicle further includes a wheel speed sensor 11, a resolver sensor 10 and a yaw rate sensor 5. The wheel speed sensor 11 is configured to detect a wheel speed signal of a corresponding wheel 9. The resolver sensor 10 is configured to detect a rotational speed signal of the corresponding motor 6. The yaw rate sensor 5 includes a longitudinal acceleration sensor, a lateral acceleration sensor and a yaw velocity sensor. The yaw velocity sensor is configured to detect a yaw velocity signal. The longitudinal acceleration sensor is configured to detect a longitudinal acceleration signal. The lateral acceleration sensor is configured to detect a lateral acceleration signal. It can be understood that the longitudinal acceleration sensor, the lateral acceleration sensor and the yaw velocity sensor can be integrated together. These signals can be used to control operations of the electric vehicle.

The motor 6 generates a driving force for the corresponding wheel 9, that is, the motor 6 drives the wheel 9 to rotate, so as to enable the vehicle forward or backward. The motor 6 generates a braking force for the corresponding wheel 9, that is, the motor 6 hinders the wheel 9 from rotating, so as to enable the vehicle to slow down or to stop.

There are two situations where the motor 6 generates the braking force for the vehicle: (1) regenerative brake; and (2) reverse brake.

The regenerative brake means that the motor 6 is not used as a driving motor but is used as a generator, the wheel 9 drives the motor 6 to generate power, a rotor of the motor 6 cuts magnetic induction lines of a stator of the motor 6 to generate reverse resistance so as to hinder the wheel 9 from rotating, thereby achieving an effect of speed reduction, and at the same time, the motor 6 generates recoverable electric energy.

The reverse brake means that the current of the motor 6 is controlled to be reverse (the direction of the current of the motor 6 is opposite to the direction of the current producing the driving force by the motor 6 for the wheel 9), making the motor 6 to generate a reverse torque to hinder the wheel 9 from rotating, so as to make the rotational speed of the wheel 9 to decrease or to decrease to zero.

In an embodiment of the present disclosure, the brake system 100 includes a vehicle controller 1, a signal detection sensor, and a motor controller 2. The vehicle controller 1, the signal detection sensor and the motor controller 2 may communicate with each other through a controller area network (CAN) bus of the vehicle. The battery pack 4 may be connected with the motor controller 2 through a high voltage wire.

In an embodiment of the present disclosure, the brake system 100 includes four motor controllers 2. Each motor controller 2 may control the corresponding motor 6. The motor controller 2 may be connected with the corresponding motor 6 through the high voltage wire. Each motor 6 is configured to control the corresponding wheel 9 to operate, for example, generate the driving force or the braking force for the wheel 9.

The signal detection sensor is configured to detect a brake pedal depth signal and a vehicle speed signal. In an embodiment of the present disclosure, the signal detection sensor is further configured to detect a brake pressure signal. In an embodiment of the present disclosure, the signal detection sensor includes a brake pedal depth sensor 3, a vehicle speed sensor 5A and a brake pressure sensor (not shown).

The brake pedal depth sensor 3 is connected with a brake pedal of the vehicle and configured to detect the brake pedal depth signal.

For example, when a driver does not depress the brake pedal, the brake pedal depth sensor 3 may generate a brake pedal depth signal indicating a brake depth of 0%; when the driver depresses the brake pedal, for example, when the depressed depth is 10% of the total depth of the brake pedal, the brake pedal depth sensor 3 may generate a brake pedal depth signal indicating a brake depth of 10%.

The vehicle speed sensor 5A is configured to detect the vehicle speed signal. The brake pressure sensor is configured to detect the brake pressure signal. The brake pressure sensor is connected with the brake actuator 12. For example, the brake pressure sensor detects a brake hydraulic pressure of the brake actuator 12, and outputs a brake pressure signal corresponding to the brake hydraulic pressure to the vehicle controller 1. When the brake actuator 12 brakes the wheels 9, the brake toque of the brake actuator 12 may fail because the brake hydraulic pressure of the brake actuator 12 for a certain wheel 9 or multiple wheels 9 is abnormal, the vehicle controller 1 may determine the specific wheel 9 for which the hydraulic brake fails according to the brake pressure signal fed back by the brake pressure sensor.

The vehicle controller 1 includes a first brake control unit and a second brake control unit. In an embodiment of the present disclosure, the first brake control unit and the second brake control unit are integrated into the vehicle controller 1. In an embodiment of the present disclosure, the vehicle controller 1 is further integrated with a brake stability control (BSC) unit and other control units.

The first brake control unit is configured to determine a brake mode of the electric vehicle according to the brake pedal depth signal, to determine whether a current value of a state of charge (SOC) of the battery pack 4 is greater than a preset value of the SOC and to determine whether a vehicle speed value of the electric vehicle is less than a preset vehicle speed value according to the vehicle speed signal.

In this embodiment, when a brake pedal depth value is greater than a first preset brake value and less than a second preset brake value, the first brake control unit determines that the electric vehicle is in the first brake mode. When the brake pedal depth value is greater than the second preset brake value, the first brake control unit determines that the electric vehicle is in the second brake mode. The second preset brake value is greater than the first preset brake value. The brake pedal depth value is carried in the brake pedal depth signal.

As an example, the first preset brake value is a brake depth of 0%, that is to say, the brake pedal is not depressed. The second preset brake value is a brake depth of 30%, that is to say, the depth by which the brake pedal is depressed is 30% of the total depth of the brake pedal. It should be noted that, in other embodiments, the second preset brake value may also be understood as the depressed brake depth of another percentage of the total depth of the brake pedal; reference can be made to the relationship between damping of the brake pedal and the depth by which the brake pedal is depressed, performance of the vehicle, security of the vehicle and some other factor settings for the specific percentage. In addition, the first preset brake value and the second preset brake value may also be set to other percentages according to actual situations.

Therefore, in this embodiment, the first brake mode may be configured as a mild brake mode of the vehicle, and the second brake mode may be configured as a sudden brake mode of the vehicle.

In other embodiments, it is also feasible to transform the brake pedal depth into brake strength, for example, the brake strength is calibrated according to the brake pedal depth. The first brake control unit is preset with a correspondence table of the brake pedal depth and the brake strength. The first brake control unit acquires the brake strength according to the collected brake pedal depth signal and the correspondence table, and determines whether the value of the brake strength is greater than a preset value of the brake strength to determine the brake mode of the vehicle. For example, the brake pedal depth signal with the brake depth of 30% corresponds to the brake strength of 0.2 g (g is gravitational acceleration), and the preset value of the brake strength may be set to 0.2 g.

If the electric vehicle is in the first brake mode and the vehicle speed value is less than the preset vehicle speed value, or if the electric vehicle is in the first brake mode and the current value of the SOC is greater than the preset value of the SOC, the second brake control unit is configured to control the brake actuator 12 to brake the wheels 9 of the electric vehicle.

If the electric vehicle is in the first brake mode and the vehicle speed value is not less than the preset vehicle speed value and the current value of the SOC is not greater than the preset value of the SOC, the first brake control unit is configured to control the motor 6 to regeneratively brake the wheel 9 through the motor controller 2.

If the electric vehicle is in the second brake mode, the second brake control unit is configured to control the brake actuator 12 to brake the wheels 9 of the electric vehicle.

In a braking process for the wheels 9 by the brake actuator 12, the first brake control unit is configured to determine whether a brake torque of the brake actuator 12 on the wheels 9 fails according to the brake pressure signal.

If the brake torque of the brake actuator 12 on the wheels 9 fails and the vehicle speed value is not less than the preset vehicle speed value and the current value of the SOC is not greater than the preset value of the SOC, the first brake control unit is configured to control the motor 6 to regeneratively brake the wheel 9 through the motor controller 2.

If the brake torque of the brake actuator 12 on the wheels 9 fails and the vehicle speed value is less than the preset vehicle speed value, or when the brake torque of the brake actuator 12 on the wheels 9 fails and the current value of the SOC is greater than the preset value of the SOC, the first brake control unit is configured to control the motor 6 to reversely brake the wheel 9 through the motor controller 2.

In an embodiment, when the vehicle is in the first brake mode, it is determined whether the motor 6 is used to regeneratively brake the wheel 9 depending on the vehicle speed and the SOC of the battery pack 4 to determine. The SOC is generally represented with percentage, for example, 10% SOC indicates that the SOC of the battery pack 4 is 10% of the total state. On one hand, if the vehicle speed is too small, the resistance, which is generated when the wheel 9 drives the rotor of the motor 6 to cut the magnetic induction lines of the stator of the motor 6, is difficult to meet the requirement for slowing down or stopping the vehicle because the motor 6 has very low efficiency in a low speed state. On the other hand, if the SOC is greater, the electric energy recovered by the motor 6 during the regenerative brake is easy to damage the battery pack 4. Therefore, in this embodiment, the preset vehicle speed value is 10 km/h, and the preset value of the SOC is 90%.

The brake torque of a single motor 6 for the wheel 9 is determined according to a formula of:

$$T = \begin{cases} k1*k2*\dfrac{9550P_n}{n_0}, & \text{when } n \le n_0 \\ k1*k2*\dfrac{9550P_n}{n}, & \text{when } n > n_0 \end{cases}$$

wherein T indicates the brake torque which is in unit of Nm, $P_n$ is the power of the motor 6 which is in unit of kW, n is a rotational speed of the motor 6, $n_0$ is a preset rotational speed of the motor 6, n and $n_0$ are in unit of r/m, k1 indicates the brake pedal depth which ranges from 0% to 100%, for example, 30%, and k2 indicates the correction coefficient of the brake pedal depth. After the rotational speed of the motor 6 exceeds the specific rotational speed $n_0$, the brake torque of the motor 6 decreases; therefore, when the rotational speed of the motor 6 is equal to $n_0$, the motor 6 reaches the maximum brake torque.

The power $P_n$ of the motor 6 is denoted by $P_n=U*I$, and is determined according to the brake pedal depth k1, that is, the power $P_n$ of the motor 6 and the brake pedal depth k1 have an one-to-one correspondence. This correspondence may be preset in the first brake control unit. The rotational speed n of the motor 6 is denoted by $$n = \dfrac{V*i}{0.337*r},$$

wherein V is the vehicle speed, r is a rolling radius of the wheel 9, and i is a transmission ratio of the transmission 7.

Hence, the first brake control unit calculates the total brake torque Ta=4*T provided by the four motors 6, and the maximum total brake torque provided by the four motors 6 is the total brake torque Tam when the rotational speed is equal to $n_0$, that is, $$Tam = 4*k1*k2*\dfrac{9550P_n}{n_0}.$$

It should be noted that, in the brake system 100 of the present disclosure, the maximum total brake torque Tam provided by the four motors 6 is at least equivalent to the maximum hydraulic brake torque (for example, the maximum hydraulic brake torque provided by four brake calipers) provided by the brake actuator 12. That is, when there is no brake actuator 12, the brake system 100 also can achieve the same effect (for example, the same brake distance or brake deceleration) as using the brake actuator 12 by only using the motors 6 to brake the wheels 9. In this case, where the brake toque of the brake actuator 12 can meet the brake torque required by the driver, the brake toque of the motors 6 also can meet the brake torque required by the driver. The brake torque required by the driver may be acquired through the brake pedal depth signal, for example, the maximum brake torque required by the driver is the brake torque required when the brake pedal is floored; at this point, the brake pedal depth signal is a signal with a brake depth of 100%. The maximum brake torque required by the driver is not greater than the maximum brake torque Tam provided by the four motors 6. Thus, it is feasible to calibrate the brake torque when the brake pedal is floored as the maximum brake torque provided by the four motors 6 when the brake toque of the brake actuator 12 completely fails.

Therefore, after the total brake torque Ta provided by the four motors 6 is calculated, the first brake control unit allocates the total brake torque Ta to the four motors 6 according to an ideal front-rear shaft braking force allocation curve (that is, curve I). For example, a proportional constant of front-rear shaft braking force allocation is k3, for example, k3=0.6, and brake torques are uniformly allocated to left wheels and right wheels. Therefore, the brake torque allocated to the front shaft is k3*Ta, the brake torque allocated to the rear shaft is (1−k3)*Ta, the brake torque allocated to the left front wheel is T1=0.5*k3*Ta, the brake torque allocated to the right front wheel is T1=0.5*k3*Ta, the brake torque allocated to the left rear wheel is T2=0.5*(1−k3)*Ta, and the brake torque allocated to the right rear wheel is T2=0.5*(1−k3)*Ta. The first brake control unit calculates currents required by the four motors 6 respectively according to the allocated brake torques.

When the electric vehicle is in the first brake mode and the vehicle speed value is not less than the preset vehicle speed value and the current value of the SOC is not greater than the preset value of the SOC, as the brake system 100 only uses the motors 6 to brake the wheels 9, the correction coefficient is k2=1, the brake torque Tn1 required by the vehicle is provided by the four motors 6, that is, Tn1=Ta.

The first brake control unit sends a brake torque allocation signal to the four motor controllers 2 respectively. Each motor controller 2 controls the corresponding motor 6 to regeneratively brake the wheel 9 according to the brake torque allocation signal. For example, if the brake torque allocated to the left front wheel 9 is T1=0.5*k3*Ta, the brake torque provided by the motor 6 corresponding to the left front wheel 9 is T=T1. Therefore, the motor controller 2 corresponding to the left front wheel 9 makes the stator of the motor 6 generate a magnetic field according to the current required by the motor and calculated by the first brake control unit, and the magnetic field generates rotation resistance for the rotor, thereby reducing the rotational speed of the wheel 9.

At the same time, the wheel 9 drives the rotor of the motor 6 to cut the magnetic induction lines generated by the stator of the motor 6, the motor 6 outputs electric energy, and the first brake control unit stores the electric energy generated by the motor 6 into the battery pack 4.

In an embodiment of the present disclosure, the second brake control unit may be an ABS.

When the electric vehicle is in the first brake mode and the vehicle speed value is less than the preset vehicle speed value, or when the electric vehicle is in the first brake mode and the current value of the SOC is greater than the preset value of the SOC, or when the vehicle is in the second brake mode, the brake torque required by a single wheel 9 and calculated by the first brake control unit is:

$$T_w = u*R*F_0 = u*R*\dfrac{\pi d^2}{4}P_0,$$

wherein $F_0$ is a pressing force of a brake caliper for a brake disc, $$F_0 = \dfrac{\pi d^2}{4}P_0,$$

$P_0$ is a hydraulic pressure of the brake actuator 12, $P_0$ and the brake pedal depth k1 have a correspondence, that is, the hydraulic pressure $P_0$ and the brake pedal depth k1 have an one-to-one correspondence, this correspondence may be preset in the first brake control unit, d is a brake cylinder diameter of the brake actuator 12, u is a friction coefficient, and R is an action radius.

Therefore, in this case, the brake torque required by the vehicle is Tn2=4*Tw. Thus, after the total brake torque Tn2 provided by the brake actuator 12 is calculated, the first brake control unit allocates the total brake torque Tn2 to the brake actuator 12 according to the ideal front-rear shaft braking force allocation curve (that is, curve I). Reference can be made to the allocation principle of the total brake torque Ta provided by the motors 6 for an allocation principle.

The first brake control unit sends a brake torque allocation signal to the second brake control unit. The second brake control unit controls the brake actuator 12 to brake the wheels 9 of the electric vehicle according to the brake torque allocation signal.

In this embodiment, the brake actuator 12 includes a brake master cylinder, a wheel cylinder, a brake disc and a brake caliper. The brake disc is mounted on a hub and rotates together with the wheel. When the brake pedal is depressed, a pushing rod connecting the brake pedal with the brake master cylinder will make the brake master cylinder generate a hydraulic pressure. The hydraulic pressure generated by the brake master cylinder is transferred to the wheel cylinder. The wheel cylinder applies a pressure to the brake caliper to generate a friction force for the brake disc, thus braking the corresponding wheel 9.

The second brake control unit allocates the total brake torque Tn2 to each wheel 9 according to the brake torque allocation signal. The brake actuator 12 brakes the corresponding wheel 9 according to allocation of the brake torque. For example, the second brake control unit can adjust the hydraulic pressure on each wheel 9, to cause the brake actuator 12 to brake the wheel 9 according to the hydraulic pressure on the wheel 9. For example, if the brake torque allocated to the left front wheel 9 is T1=0.5*k3*Tn2, the brake torque provided by the brake caliper corresponding to the left front wheel 9 is T'=T1.

When the brake actuator 12 brakes the wheels 9, considering that brake torque of the brake actuator 12 on the wheels 9 may fail and lead to a vehicle crash risk, the first brake control unit can determine whether the brake torque of the brake actuator 12 on the wheels 9 fails according to the brake pressure signal. For example, the brake pedal depth signal and the brake pressure signal have an one-to-one correspondence. When the brake actuator 12 brakes normally, brake pressure signals of the four wheels 9 collected by the first brake control unit are normal brake pressure signals. When one or more of the brake pressure signals are abnormal, the first brake control unit determines that a brake torque of the brake actuator 12 on the wheel 9 corresponding to the abnormal brake pressure signal fails.

After determining that the brake torque of the brake actuator 12 on the wheels 9 fails, the first brake control unit determines the vehicle speed and the SOC of the battery pack 4. When the vehicle speed value is less than a preset vehicle speed value, or the current value of the SOC is greater than a preset value of the SOC, as it is inappropriate for the motor 6 to brake the wheel 9 in a regenerative brake manner at this point, the first brake control unit controls the motor 6 to reversely brake the wheel 9 through the motor controller 2. For example, the brake torque T provided by the motor 6 may be allocated to the brake torque T' of the hydraulic brake corresponding to the one or more wheels 9, and the motor controller 2 makes the motor 6 generate a reverse torque according to a current required by the motor 6, thus making the rotational speed of the wheel 9 decrease or decrease to zero, to achieve a brake effect.

Specifically, it is assumed that the hydraulic brake corresponding to the left front wheel 9 fails. Before the brake actuator 12 fails, as stated above, the allocated brake torque of the left front wheel 9 is T1=0.5*k3*Tn2. Then, the brake torque required by the motor 6 corresponding to the left front wheel 9 is $$T = T1 = k1 * k2 * \frac{9550 P_n}{n},$$

and $P_n$ can be obtained according to the brake pedal depth k1, where $P_n = U*I$, and $$n = \frac{V*i}{0.377*r}.$$

On one hand, the first brake control unit adjusts a transmission ratio i of the transmission 7 through a transmission controller (not shown) and adjusts a current I of the motor 6 through the motor controller 2, to make the brake torque T provided by the motor 6 corresponding to the left front wheel 9 equal to the required brake torque T1.

On the other hand, the transmission ratio i of the transmission 7 and the current I of the motor 6 are non-continuous fixed values, and it is difficult to precisely make the brake torque T provided by the motor 6 equal to the required brake torque T1; therefore, the first brake control unit makes them equal to meet the brake requirement by adjusting the correction coefficient k2 of the brake pedal depth.

It should be noted that, when the vehicle is in the second brake mode, considering that instantaneous charging power of the motor 6 is relatively great, it is easy to cause damage to the motor 6 and the battery pack 4, and thus, when the brake actuator 12 does not fail, the second brake control unit controls the brake actuator 12 to brake the wheels 9 without intervention of brake of the motor 6.

To sum up, in the brake system 100, the first brake control unit determines the brake mode of the electric vehicle through the brake pedal depth signal, and takes different brake measures in different brake modes and on different working conditions of the vehicle to make the brake of the motor 6 and the brake of the brake actuator 12 cooperate with each other. At the same time, when the brake of the brake actuator 12 on the wheel 9 fails, the first brake control unit can control the motor 6 to brake the wheel 9, which effectively reduces the vehicle crash risk brought about by brake failure.

Figure 2:
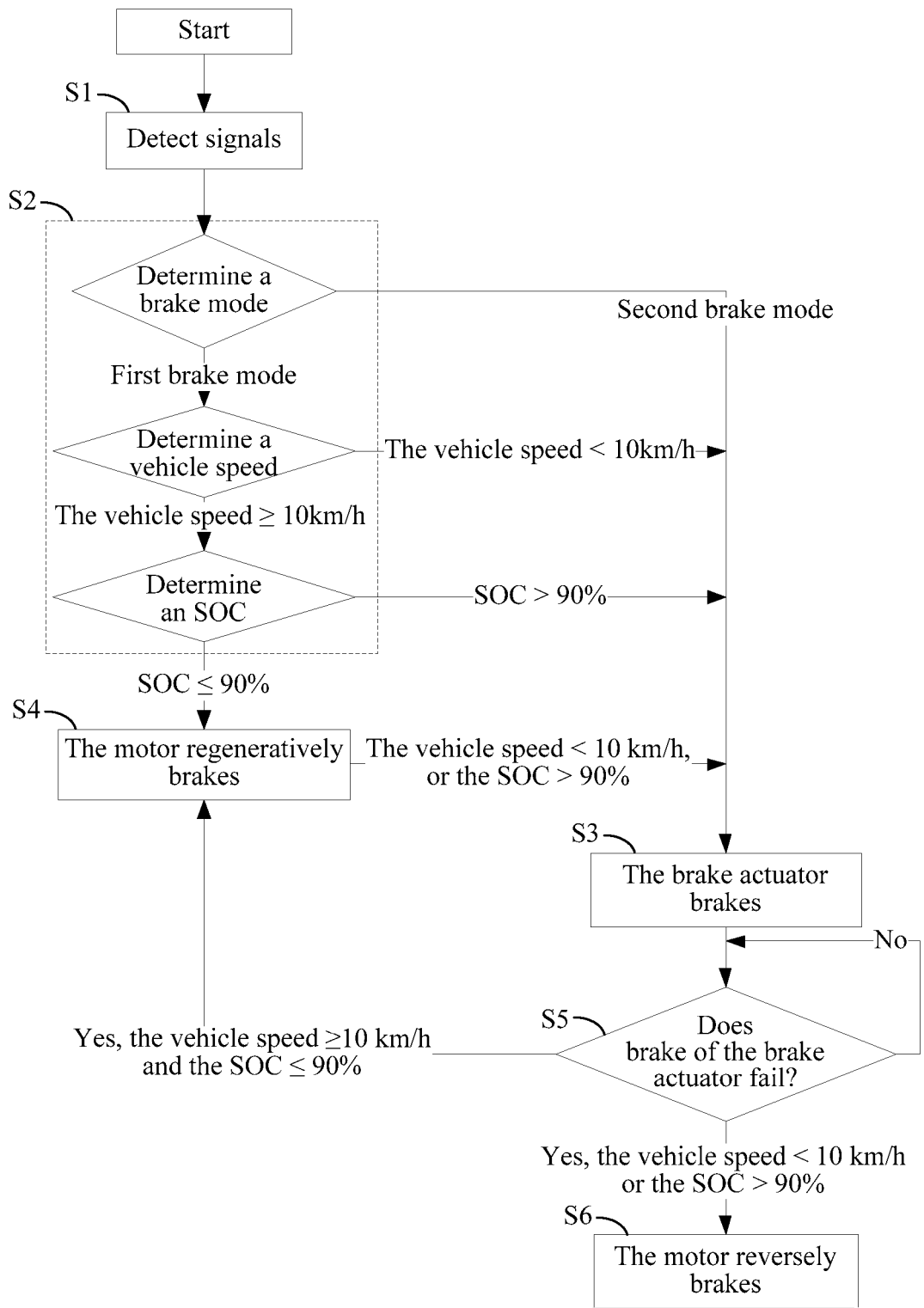
FIG. 2 is a schematic flowchart of a brake method for a four-wheel drive electric vehicle according to an embodiment of the present disclosure.

Referring to FIG. 2, an embodiment of the present disclosure provides a brake method for a four-wheel drive electric vehicle. The brake method may be implemented by the brake system 100 for a four-wheel drive electric vehicle in any above embodiments. The brake method includes the followings:

S1: the signal detection sensor detects a brake pedal depth signal, a vehicle speed signal and a brake pressure signal, and then the process proceeds to S2.

S2: it is determined a brake mode of the electric vehicle according to the brake pedal depth signal, whether an current value of an SOC of the battery pack 4 is greater than a preset value of the SOC and whether a vehicle speed value of the electric vehicle is less than a preset vehicle speed value according to the vehicle speed signal. The brake mode of the electric vehicle includes a first brake mode and a second brake mode. If the electric vehicle is in the first brake mode and the vehicle speed value is less than the preset vehicle speed value, or if the electric vehicle is in the first brake mode and the current value of the SOC is greater than the preset value of the SOC, the process proceeds to S3. If the electric vehicle is in the first brake mode and the vehicle speed value is not less than the preset vehicle speed value and the current value of the SOC is not greater than the preset value of the SOC, the process proceeds to S4. If the electric vehicle is in the second brake mode, the process proceeds to S3.

S3: the second brake control unit controls the brake actuator 12 to brake the wheels 9 of the electric vehicle, and then the process proceeds to S5.

S4: the first brake control unit controls the motor 6 to regeneratively brake the wheel 9 through the motor controller 2.

S5: in a braking process for the wheels by the brake actuator 12, the first brake control unit determines according to the brake pressure signal whether a brake torque of the brake actuator 12 on the wheels 9 fails. If the brake torque of the brake actuator 12 on the wheels 9 fails and the vehicle speed value is not less than the preset vehicle speed value and the current value of the SOC is not greater than the preset value of the SOC, the process proceeds to S4. If the brake torque of the brake actuator 12 on the wheels 9 fails and the vehicle speed value is less than the preset vehicle speed value, or if the brake torque of the brake actuator 12 on the wheels 9 fails and the current value of the SOC is greater than the preset value of the SOC, the process proceeds to S6. If the brake torque of the brake actuator 12 on the wheels 9 is normal, S5 continues.

S6: the first brake control unit controls the motor 6 to reversely brake the wheel 9 through the motor controller 2.

In S1, in this embodiment, the signal detection sensor includes a brake pedal depth sensor 3, a vehicle speed sensor 5A and a brake pressure sensor. The brake pedal depth sensor 3 is connected with the brake pedal of the vehicle and detects the brake pedal depth signal.

The vehicle speed sensor 5A detects the vehicle speed signal. The brake pressure sensor detects the brake pressure signal. The brake pressure sensor is connected with the brake actuator 12. For example, the brake pressure sensor detects a brake hydraulic pressure of the brake actuator 12, and outputs the brake pressure signal corresponding to the brake hydraulic pressure to the vehicle controller 1. When the brake actuator 12 brakes the wheels 9, and if the brake hydraulic pressure of the brake actuator 12 for a certain wheel 9 or multiple wheels 9 is abnormal and leads to brake failure, the first brake control unit may determine the specific wheel 9 for which the hydraulic brake fails according to the brake pressure signal fed back by the brake pressure sensor.

In S2, when a brake pedal depth value is greater than a first preset brake value and less than a second preset brake value, the first brake control unit is configured to determine that the electric vehicle is in the first brake mode. When the brake pedal depth value is greater than the second preset brake value, the first brake control unit is configured to determine that the electric vehicle is in the second brake mode, and the second preset brake value is greater than the first preset brake value. The brake pedal depth value is carried in the brake pedal depth signal.

In this embodiment, as an example, the first preset brake value is a brake depth of 0%. The second preset brake value is a brake depth of 30%.

The SOC of the battery pack 4 is generally represented by percentage, for example, the SOC 10% indicates that the SOC of the battery pack 4 is 10% of the total state. The present value of the SOC is 90%, and the preset vehicle speed value is 10 km/h.

On one hand, if the vehicle speed is too small, the resistance, which is generated when the wheel 9 drives the rotor of the motor 6 to cut the magnetic induction lines of the stator of the motor 6, is difficult to meet the requirement for slowing down or stopping the vehicle because the motor 6 has very low efficiency in a low speed state. On the other hand, if the SOC is greater, the electric energy recovered by the motor 6 during the regenerative brake is easy to damage the battery pack 4. Therefore, in S3, the second brake control unit controls the brake actuator 12 to brake the wheels 9 of the electric vehicle without intervention of brake of the motor 6.

In S4, the brake torque of regenerative brake of the motor 6 is calculated in two situations.

The first situation is from S1→S2→S4: the first brake control unit calculates a brake torque Tn1=Ta=4*T required by the vehicle according to the brake pedal depth signal, and then allocates the required brake torque Tn1 to each motor 6 according to a braking force allocation curve. The motor controller 2 controls a required current to be input into the motor 6 according to the current required by the motor 6 and calculated by the first brake control unit, to make the stator of the motor 6 generate a magnetic field, which generates rotation resistance for the rotor and thus reduces the rotational speed of the wheel 9.

At the same time, the wheel 9 drives the rotor of the motor 6 to cut the magnetic induction lines generated by the stator of the motor 6, the motor 6 outputs electric energy, and the first brake control unit stores the electric energy generated by the motor 6 into the battery pack 4.

The second situation is from S1→S2→S3→S5→S4:
that is, when the brake torque of the brake actuator 12 on the wheels 9 fails and the vehicle speed value is not less than the preset vehicle speed value and the current value of the SOC is not greater than the preset value of the SOC, the first brake control unit controls the motor 6 to regeneratively brake the wheel 9 through the motor controller 2. For example, the brake torque T provided by the motor 6 may be allocated to the brake torque T1 of the hydraulic brake corresponding to the one or more wheels 9, and the motor controller 2 makes the stator of the motor 6 generate a magnetic field that hinders the rotor of the motor 6 from rotating according to a current required by the motor 6, thus making the rotational speed of the wheel 9 decrease or decrease to zero, to achieve a brake effect.

Specifically, it is assumed that the hydraulic brake corresponding to the left front wheel 9 fails. Before the brake actuator 12 fails, as stated above, the allocated brake torque of the left front wheel 9 is T1=0.5*k3*Tn2. Then, the brake torque required by the motor 6 corresponding to the left front wheel 6 is $$T = T1 = k1 * k2 * \frac{9550 P_n}{n},$$

and $P_n$ can be obtained according to the brake pedal depth k1, where $P_n = U*I$, and $$n = \frac{V*i}{0.377*r}.$$

On one hand, the first brake control unit adjusts a transmission ratio i of the transmission 7 through a transmission controller and adjusts a current I of the motor 6 through the motor controller 2, to make the brake torque T provided by the motor 6 corresponding to the left front wheel 9 equal to the required brake torque T1.

On the other hand, the transmission ratio i of the transmission 7 and the current I of the motor 6 are non-continuous fixed values, and it is difficult to precisely make the brake torque T provided by the motor 6 equal to the required brake torque T1; therefore, the first brake control unit makes them equal to meet the brake requirement by adjusting the brake correction coefficient k2 of the pedal depth.

In S5, when the brake actuator 12 brakes the wheels 9, considering that brake of the brake actuator 12 on the wheels 9 may fail and lead to a vehicle crash risk, the first brake control unit can determine according to the brake pressure signal whether the brake torque of the brake actuator 12 on the wheels 9 fails. For example, the brake pedal depth signal and the brake pressure signal have an one-to-one correspondence. When the brake actuator 12 brakes normally, brake pressure signals of the four wheels 9 collected by the first brake control unit are normal brake pressure signals. When one or more of the brake pressure signals are abnormal, the first brake control unit determines that a brake torque of the brake actuator 12 on the wheel 9 corresponding to the abnormal brake pressure signal fails.

After determining that the brake torque of the brake actuator 12 on the wheels 9 fails, the first brake control unit determines the vehicle speed and the SOC of the battery pack.

In S6, that is, when the vehicle speed value is less than the preset vehicle speed value or the current value of the SOC is greater than the preset value of the SOC, as it is inappropriate for the motor 6 to brake the wheel 9 in a regenerative brake manner at this point, the first brake control unit controls the motor 6 to reversely brake the wheel 9 through the motor controller 2. For example, the brake torque provided by the motor 6 may be allocated to the brake torque of the hydraulic brake corresponding to the one or more wheels 9, and the motor controller 2 makes the motor 6 to generate a reverse torque according to a current required by the motor 6, thus making the rotational speed of the wheel 9 to decrease or to decrease to zero, so as to achieve a brake effect.

It is assumed that the hydraulic brake corresponding to the left front wheel 9 fails. Before the brake actuator fails, as stated above, the allocated brake torque of the left front wheel 9 is T1=0.5*k3*Tn2. Then, the brake torque required by the motor 6 corresponding to the left front wheel 9 is $$n = \frac{V*i}{0.377*r}.$$

and $P_n$ can be obtained according to the brake pedal depth k1, where $P_n=U*I$, and $$T = T1 = k1*k2*\frac{9550P_n}{n},$$

On the one hand, the first brake control unit adjusts a transmission ratio i of the transmission 7 through a transmission controller and adjusts a current I of the motor 6 through the motor controller 2, to make the brake torque T provided by the motor 6 corresponding to the left front wheel 9 equal to the required brake torque T1.

On the other hand, the transmission ratio i of the transmission 7 and the current I of the motor 6 are non-continuous fixed values, and it is difficult to precisely make the brake torque T provided by the motor 6 equal to the required brake torque T1; therefore, the first brake control unit makes them equal to meet the brake requirement by adjusting the correction coefficient k2 of the brake pedal depth. Specifically, the current transmission ratio is fixed, the current I is continuously variable, the function of the correction coefficient k2 is to make the brake torque T of the motor equal to the brake torque T1 in the case of hydraulic failure by modifying the magnitude of the current I at a pedal depth k1, that is, T=T1; at this point, T, T1, k1, Pn=U*I and n can be seen as known variables, and from the formula $$T = T1 = k1*k2*\frac{9550P_n}{n},$$

k2 is calculated by the first brake control unit.

To sum up, in the brake method, the first brake control unit determines the brake mode of the electric vehicle through the brake pedal depth signal, and takes different brake measures in different brake modes and on different working conditions of the vehicle to make the brake of the motor and the brake of the brake actuator cooperate with each other. At the same time, when the brake of the brake actuator on the wheel fails, the first brake control unit can control the motor to brake the wheel, which effectively reduces the vehicle crash risk brought about by brake failure.

Embodiments of the present disclosure also provide a four-wheel drive electric vehicle, the electric vehicle including the brake system 100 for a four-wheel drive electric vehicle as stated above; a battery pack; a motor; and a brake actuator, in which the battery pack, the motor and the brake actuator are connected with the brake system for a four-wheel drive electric vehicle respectively. Therefore, the electric vehicle can effectively reduce the vehicle crash risk brought about by brake failure.

In the description of the specification, the reference term "an embodiment," "some embodiments," "one embodiment", "schematic example," "an example," "a specific example," or "some examples," means that a particular feature, structure, material, or characteristic described in connection with the embodiment or example is included in at least one embodiment or example of the present disclosure. Thus, the schematic expressions of the terms are not necessarily referring to the same embodiment or example of the present disclosure. Furthermore, the particular features, structures, materials, or characteristics may be combined in any suitable manner in one or more embodiments or examples.

Any process or method in the flow chart or described herein in other manners can be understood as indicating modules, fragments or parts of codes that include one or more executable instructions configured to implement a specific logical function or process steps, and the scope of preferred implementation manners of the present disclosure includes other implementations, in which the functions can be executed not in an order illustrated or discussed, including in a basically simultaneous manner in accordance with the functions involved or in a reverse order, which should be understood by those skilled in the art of the embodiments of the present disclosure.

Logics and/or steps expressed in the flow chart or described herein in other manners, for example, can be considered to be a sequencing list of executable instructions configured to implement logical functions, and can be specifically implemented in any computer readable medium, to be used by an instruction executing system, apparatus or device (for example, a computer based system, a system including a processor or another system that can read an instruction from the instruction executing system, apparatus or device and execute the instruction), or used in combination with the instruction executing systems, apparatuses or devices. In terms of the specification, the "computer readable medium" may be any apparatus that can include, store, communicate, propagate or transmit a program to be used by the instruction executing systems, apparatuses or devices or used in combination with the instruction executing systems, apparatuses or devices. A more specific example (non-exhaustive list) of the computer readable medium includes the following: an electrical connecting portion (electronic apparatus) having one or more wires, a portable computer disk box (magnetic apparatus), a random access memory (RAM), a read only memory (ROM), an erasable programmable read only memory (EPROM or a flash memory), an optical fiber apparatus, and a portable compact disc read only memory (CDROM). In addition, the computer readable medium may even be a piece of paper on which the program can be printed or another suitable medium, because the program can be obtained in an electronic manner, for example, by performing optical scanning on the paper or another medium and then editing, decoding or, if necessary, processing it in other suitable manners, which is then stored in a computer memory.

It should be understood that various parts of the present disclosure can be implemented with hardware, software, firmware or their combinations. In the foregoing implementation manners, multiple steps or methods can be implemented by software or firmware which is stored in a memory and executed by a suitable instruction executing system. For example, if the steps or methods are implemented with hardware, like in another implementation manner, implementation can be completed by using any one of the following technologies well known in the art or their combinations: a discrete logic circuit which has a logic gate circuit configured to implement a logical function on a data signal, a specific integrated circuit which has a suitable combinational logic gate circuit, a programmable gate array (PGA), a field programmable gate array (FPGA) and so on.

Those of ordinary skill in the art can understand that implementation of all or some steps carried in the method of the foregoing embodiments can be completed by a program instructing relevant hardware, the program can be stored in a computer readable medium, and the program, when being executed, includes one of the steps of the method embodiment or a combination thereof.

In addition, the functional units in the various embodiments of the present disclosure may be integrated into one processing module, or each of the units may exist alone physically, or two or more units may be integrated into one module. The integrated module may be implemented in the form of hardware, or may be implemented in the form of a software functional module. The integrated module may also be stored in a computer readable storage medium if implemented in the form of a software functional module and sold or used as a separate product.

The storage medium mentioned above may be a read only memory, a magnetic disk, an optical disc, or the like. Although the embodiments of the present disclosure have been illustrated and described above, it can be understood that the embodiments are exemplary and cannot be understood as limitations to the present disclosure, and those of ordinary skill in the art can change, modify, replace and transform the embodiments within the scope of the present disclosure.

What is claimed is:

1. A brake system for a four-wheel drive electric vehicle, comprising:

a vehicle controller, comprising a first brake control unit and a second brake control unit;

a signal detection sensor, configured to detect a brake pedal depth signal and a vehicle speed signal; and a motor controller, wherein, the first brake control unit is configured to determine a brake mode of the electric vehicle according to the brake pedal depth signal, to determine whether a current value of a state of charge for a battery pack of the electric vehicle is greater than a preset value of the state of charge and to determine whether a vehicle speed value of the electric vehicle is less than a preset vehicle speed value according to the vehicle speed signal, wherein the brake mode of the electric vehicle comprises a first brake mode and a second brake mode;

the motor controller is configured to control a motor of the electric vehicle to regeneratively brake a wheel of the electric vehicle when the electric vehicle is in the first brake mode, the vehicle speed value is greater than or equal to the preset vehicle speed value, and the current value of the state of charge is less than or equal to the preset value of the state of charge; and the second brake control unit is configured to control a brake actuator of the electric vehicle to brake the wheels of the electric vehicle when the electric vehicle is in the first brake mode and the vehicle speed value is less than the preset vehicle speed value, or when the electric vehicle is in the first brake mode and the current value of the state of charge is greater than the preset value of the state of charge, or when the electric vehicle is in the second brake mode wherein the signal detection sensor is further configured to detect a brake pressure signal;

the first brake control unit is further configured to determine whether a brake torque of the brake actuator on the wheels fails in a braking process for the wheels by the brake actuator according to the brake pressure signal; and the motor controller is further configured to control the motor to regeneratively brake the wheel when the brake torque of the brake actuator on the wheels fails and the vehicle speed value is greater than or equal to the preset vehicle speed value and the current value of the state of charge is less than or equal to the preset value of the state of charge, and to control the motor to reversely brake the wheel when the brake torque of the brake actuator on the wheels fails and the vehicle speed value is less than the preset vehicle speed value, or when the brake torque of the brake actuator on the wheels fails and the current value of the state of charge is greater than the preset value of the state of charge.

2. The brake system for a four-wheel drive electric vehicle according to claim 1, wherein the motor controller is further configured to:
acquire a current brake torque allocated to the wheel when the brake torque of the brake actuator on the wheels fails;
determine a correction coefficient of a brake pedal depth according to the current brake torque when the brake actuator fails; and
obtain a brake torque of the motor for the wheel according to power of the motor, a rotational speed of the motor, the brake pedal depth and the correction coefficient of the brake pedal depth.

3. The brake system for a four-wheel drive electric vehicle according to claim 2, wherein the brake torque of the motor for the wheel is determined according to a formula of $$T = \begin{cases} k1*k2*\dfrac{9550P_n}{n_0}, & \text{when } n \leq n_0 \\ k1*k2*\dfrac{9550P_n}{n}, & \text{when } n > n_0 \end{cases}$$

wherein T is the brake torque of the motor for the wheel, $P_n$ is the power of the motor, n is the rotational speed of the motor, n0 is a preset rotational speed of the motor, k1 is the brake pedal depth, and k2 is the correction coefficient of the brake pedal depth.

4. The brake system for a four-wheel drive electric vehicle according to claim 2, wherein the electric vehicle comprises four motors, and the brake torque when a brake pedal is floored is calibrated as the maximum brake torque provided by the four motors when the brake torque of the brake actuator completely fails.

5. The brake system for a four-wheel drive electric vehicle according to claim 1, wherein
the first brake control unit is configured to determine that the electric vehicle is in the first brake mode when a brake pedal depth value is greater than a first preset brake value and less than a second preset brake value; and
the first brake control unit is configured to determine that the electric vehicle is in the second brake mode when the brake pedal depth value is greater than the second preset brake value,
wherein the second preset brake value is greater than the first preset brake value, and the brake pedal depth value is carried in the brake pedal depth signal.

6. The brake system for a four-wheel drive electric vehicle according to claim 1, wherein the first brake control unit is configured to store electric energy generated by the motor into the battery pack when the motor regeneratively brakes the wheel.

7. The brake system for a four-wheel drive electric vehicle according to claim 1, wherein the signal detection sensor comprises a brake pedal depth sensor, a vehicle speed sensor and a brake pressure sensor;
the brake pedal depth sensor is configured to detect the brake pedal depth signal;
the vehicle speed sensor is configured to detect the vehicle speed signal; and
the brake pressure sensor is configured to detect the brake pressure signal.

8. The brake system for a four-wheel drive electric vehicle according to claim 1, wherein the first brake control unit and the second brake control unit are integrated into the vehicle controller.

9. A brake method for a four-wheel drive electric vehicle comprising:
detecting a brake pedal depth signal and a vehicle speed signal;
determining a brake mode of the electric vehicle according to the brake pedal depth signal, whether a current value of a state of charge of a battery pack of the electric vehicle is greater than a preset value of the state of charge, and whether a vehicle speed value of the electric vehicle is less than a preset vehicle speed value according to the vehicle speed signal, wherein the brake mode of the electric vehicle comprises a first brake mode and a second brake mode;
controlling a brake actuator of the electric vehicle to brake wheels of the electric vehicle when the electric vehicle is in the first brake mode and the vehicle speed value is less than the preset vehicle speed value, or when the electric vehicle is in the first brake mode and the current value of the state of charge is greater than the preset value of the state of charge, or when the electric vehicle is in the second brake mode; and
controlling a motor of the electric vehicle to regeneratively brake a wheel when the electric vehicle is in the first brake mode and the vehicle speed value is greater than or equal to the preset vehicle speed value and the current value of the state of charge is equal to or less than the preset value of the state of charge detecting a brake pressure signal;
determining whether a brake torque of the brake actuator on the wheels fails in a braking process for the wheels by the brake actuator according to the brake pressure signal;
controlling the motor to regeneratively brake the wheel when the brake torque of the brake actuator on the wheels fails and the vehicle speed value is greater than or equal to the preset vehicle speed value and the current value of the state of charge is less than or equal to the preset value of the state of charge; and
controlling the motor to reversely brake the wheel when the brake torque of the brake actuator on the wheels fails and the vehicle speed value is less than the preset vehicle speed value, or when the brake torque of the brake actuator on the wheels fails and the current value of the state of charge is greater than the preset value of the state of charge.

10. The brake method for a four-wheel drive electric vehicle according to claim 9, further comprising:
acquiring a current brake torque allocated to the wheel when the brake torque of the brake actuator on the wheels fails;
determining a correction coefficient of a brake pedal depth according to the current brake torque when the brake actuator fails; and
obtaining a brake torque of the motor for the wheel according to power of the motor, a rotational speed of the motor, the brake pedal depth and the correction coefficient of the brake pedal depth.

11. The brake method for a four-wheel drive electric vehicle according to claim 10, wherein the brake torque of the motor for the wheel is determined according to a formula of $$T = \begin{cases} k1*k2*\dfrac{9550P_n}{n_0}, & \text{when } n \leq n_0 \\ k1*k2*\dfrac{9550P_n}{n}, & \text{when } n > n_0 \end{cases}$$

wherein T is the brake torque of the motor for the wheel, $P_n$ is the power of the motor, n is the rotational speed of the motor, n0 is a preset rotational speed of the motor, k1 is the brake pedal depth, and k2 is the correction coefficient of the brake pedal depth.

12. The brake method for a four-wheel drive electric vehicle according to claim 9, wherein the step of determining a brake mode of the electric vehicle according to the brake pedal depth signal comprises:
   determining that the electric vehicle is in the first brake mode when a brake pedal depth value is greater than a first preset brake value and less than a second preset brake value; and
   determining that the electric vehicle is in the second brake mode when the brake pedal depth value is greater than the second preset brake value,
   wherein the second preset brake value is greater than the first preset brake value, and the brake pedal depth value is carried in the brake pedal depth signal.

13. The brake method for a four-wheel drive electric vehicle according to claim 9, wherein the step of controlling the motor to regeneratively brake the wheel comprises:
   storing electric energy generated by the motor into the battery pack.

14. A four-wheel drive electric vehicle, comprising:
   a brake system for a four-wheel drive electric vehicle;
   a battery pack;
   a motor; and
   a brake actuator,
   wherein the battery pack, the motor and the brake actuator are connected with the brake system for a four-wheel drive electric vehicle respectively,
   wherein the brake system comprises:
   a vehicle controller, comprising a first brake control unit and a second brake control unit;
   a signal detection sensor, configured to detect a brake pedal depth signal and a vehicle speed signal; and
   a motor controller, wherein,
   the first brake control unit is configured to determine a brake mode of the electric vehicle according to the brake pedal depth signal, to determine whether a current value of a state of charge for the battery pack of the electric vehicle is greater than a preset value of the state of charge and to determine whether a vehicle speed value of the electric vehicle is less than a preset vehicle speed value according to the vehicle speed signal, wherein the brake mode of the electric vehicle comprises a first brake mode and a second brake mode;
   the motor controller is configured to control the motor of the electric vehicle to regeneratively brake a wheel of the electric vehicle when the electric vehicle is in the first brake mode, the vehicle speed value is greater than or equal to the preset vehicle speed value, and the current value of the state of charge is less than or equal to the preset value of the state of charge; and
   the second brake control unit is configured to control the brake actuator of the electric vehicle to brake the wheels of the electric vehicle when the electric vehicle is in the first brake mode and the vehicle speed value is less than the preset vehicle speed value, or when the electric vehicle is in the first brake mode and the current value of the state of charge is greater than the preset value of the state of charge, or when the electric vehicle is in the second brake mode.

* * * * *